(12) United States Patent
Chu et al.

(10) Patent No.: US 7,200,139 B1
(45) Date of Patent: Apr. 3, 2007

(54) METHOD FOR PROVIDING VOIP SERVICES FOR WIRELESS TERMINALS

(75) Inventors: Yue-Chuan Chu, Convent Station, NJ (US); Ningming Hua, Rockaway, NJ (US)

(73) Assignee: AT&T Corp., New York, NY (US)

( * ) Notice: Subject to any disclaimer, the term of this patent is extended or adjusted under 35 U.S.C. 154(b) by 919 days.

(21) Appl. No.: 10/010,682

(22) Filed: Nov. 8, 2001

(51) Int. Cl.
*H04L 12/66* (2006.01)

(52) U.S. Cl. ............... 370/352; 370/401; 370/433; 370/395.52

(58) Field of Classification Search ............ 370/310.1, 370/310.2, 352, 395.52, 433, 517, 555, 560; 455/433, 517, 555, 560
See application file for complete search history.

(56) References Cited

U.S. PATENT DOCUMENTS

| | | | |
|---|---|---|---|
| 6,178,337 B1 * | 1/2001 | Spartz et al. | 455/561 |
| 6,366,577 B1 * | 4/2002 | Donovan | 370/352 |
| 6,404,746 B1 * | 6/2002 | Cave et al. | 370/262 |
| 6,430,176 B1 * | 8/2002 | Christie, IV | 370/355 |
| 6,434,140 B1 * | 8/2002 | Barany et al. | 370/352 |
| 6,539,237 B1 * | 3/2003 | Sayers et al. | 455/555 |
| 6,738,390 B1 * | 5/2004 | Xu et al. | 370/467 |
| 6,795,444 B1 * | 9/2004 | Vo et al. | 370/401 |
| 6,885,658 B1 * | 4/2005 | Ress et al. | 370/352 |
| 6,888,803 B1 * | 5/2005 | Gentry et al. | 370/259 |
| 6,937,563 B2 * | 8/2005 | Preston et al. | 370/230 |
| 7,010,002 B2 * | 3/2006 | Chow et al. | 370/485 |
| 2001/0043577 A1 * | 11/2001 | Barany et al. | 370/328 |
| 2002/0024943 A1 * | 2/2002 | Karaul et al. | 370/338 |
| 2002/0034166 A1 * | 3/2002 | Barany et al. | 370/329 |
| 2002/0124057 A1 * | 9/2002 | Besprosvan | 709/219 |

* cited by examiner

*Primary Examiner*—Ricky Q. Ngo
*Assistant Examiner*—Andrew C. Lee (57) ABSTRACT

The present invention relates to a system and method for wireless telecommunication in a packet-based network comprising a Software Radio Port (SRP) which functions as a radio base station and a VoIP gateway to interconnect the wireless network with the VoIP packet network. Together with a Network Server Platform (NSP) and VoIP call-server, the SRP combines mobile call processing signaling with the VoIP call signaling to establish calls between the mobile and VoIP device or between mobiles. The SRP establishes the voice path to the mobile station over the air and the RTP media path to a party over a packet network for a call. These two paths are interconnected at the SRP so that an end-to-end voice path is established.

7 Claims, 11 Drawing Sheets

MS to MS Call

METHOD FOR PROVIDING VOIP SERVICES FOR WIRELESS TERMINALS

FIELD OF THE INVENTION

The present invention relates to wireless telecommunications systems and, more particularly, to a system and method of providing Voice over IP (VoIP) service in radio base stations for wireless terminals.

BACKGROUND OF THE INVENTION

Telephone calls have been traditionally routed through the public switched telephone network (PSTN) and, more recently, over data networks using Voice over Internet Protocols (VoIP), the Internet being an example of such a data network. VoIP transmission of voice conversations with a VoIP-enabled phone serve to ease changes in the system, lower costs and provide numerous new integrated services.

Wireless telephone calls are typically routed through end-to-end circuit switching services using radio waves over the air and circuit-switched landline phone network. Wireless telecommunication systems contain a radio base station, which is a fixed device that enables communication between the mobile transceiver and a landline phone network. There is currently no method or system for providing VoIP service via a radio base station for a mobile terminal.

Therefore, there exists a need in the art to provide VoIP service via a radio base station for a wireless terminal so that a voice stream is only circuit-switched over the air and packet-switched between the radio base station and the VoIP phone network (i.e., a packet-based network).

SUMMARY OF THE INVENTION

In an exemplary embodiment of the present invention, a system and method of wireless telecommunication in a packet-based network are provided comprising receiving a call from a mobile station and converting the call processing messages to VoIP protocol messages to set up a VoIP call to the destination. Once the called party answers, a two-way Real-Time Transport Protocol (RTP) path will be established between the inventive system and the called party. A two-way voice path over the air is also established between the inventive system and the mobile station. Voice streams from the mobile station will be converted to the RTP data packets and transported to the called party. The RTP data packets received from the called party will also be converted to the voice frames to send to the mobile station over the air.

In another exemplary embodiment of the present invention, a system and method of wireless telecommunication in a packet-based network are provided comprising receiving VoIP call processing messages from the VoIP phone network and converting the call processing messages to a specific air interface protocol message to set up a call to the called mobile station. Once the called mobile station answers, a two-way voice path over the air is established between the inventive system and the mobile station. Also a two-way Real-Time Transport Protocol (RTP) path will be established between the inventive system and the calling party. Then the inventive system will perform proper conversion for voice between the air interface and the packet-based interface.

The exemplary system and method comprise a Software Radio Port that functions as a radio base station and a VoIP gateway, a VoIP call-Server that manages the call processing for VoIP calls, and a Network Server Platform that combines functions of a traditional Mobile Switching Center (MSC) and a VoIP call-server control capability.

The exemplary system and method provide for VoIP service via a radio base station for a wireless terminal so that a voice stream is only circuit-switched over the air and packet-switched over the land lines, with no need for circuit-switched land lines at the radio base station.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the foregoing and following written disclosure focus on disclosing example embodiments of this invention, it should be clearly understood that the same is by way of illustration and example only and the invention is not limited thereto. The spirit and scope of the present invention are limited only by the terms of the appended claims.

DETAILED DESCRIPTION OF THE INVENTION

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

The present invention provides a method and system that provide VoIP service for a wireless terminal. The VoIP service is provided via a radio base station wherein a received voice stream is circuit-switched over the air. The voice stream received from a mobile station (MS) is converted to RTP data packets at the radio base station and transported over a packet-switched network to a desired destination. Conversely, the radio base station converts received RTP data packets to the proper voice stream for delivery over the air to a mobile station. Different air interfaces (radio interfaces), such as GSM, IS136, CDMA, etc, can be supported by the radio base station. Different VoIP protocols can also be supported at the radio base station, such as H.323 and SIP.

Figure 1:
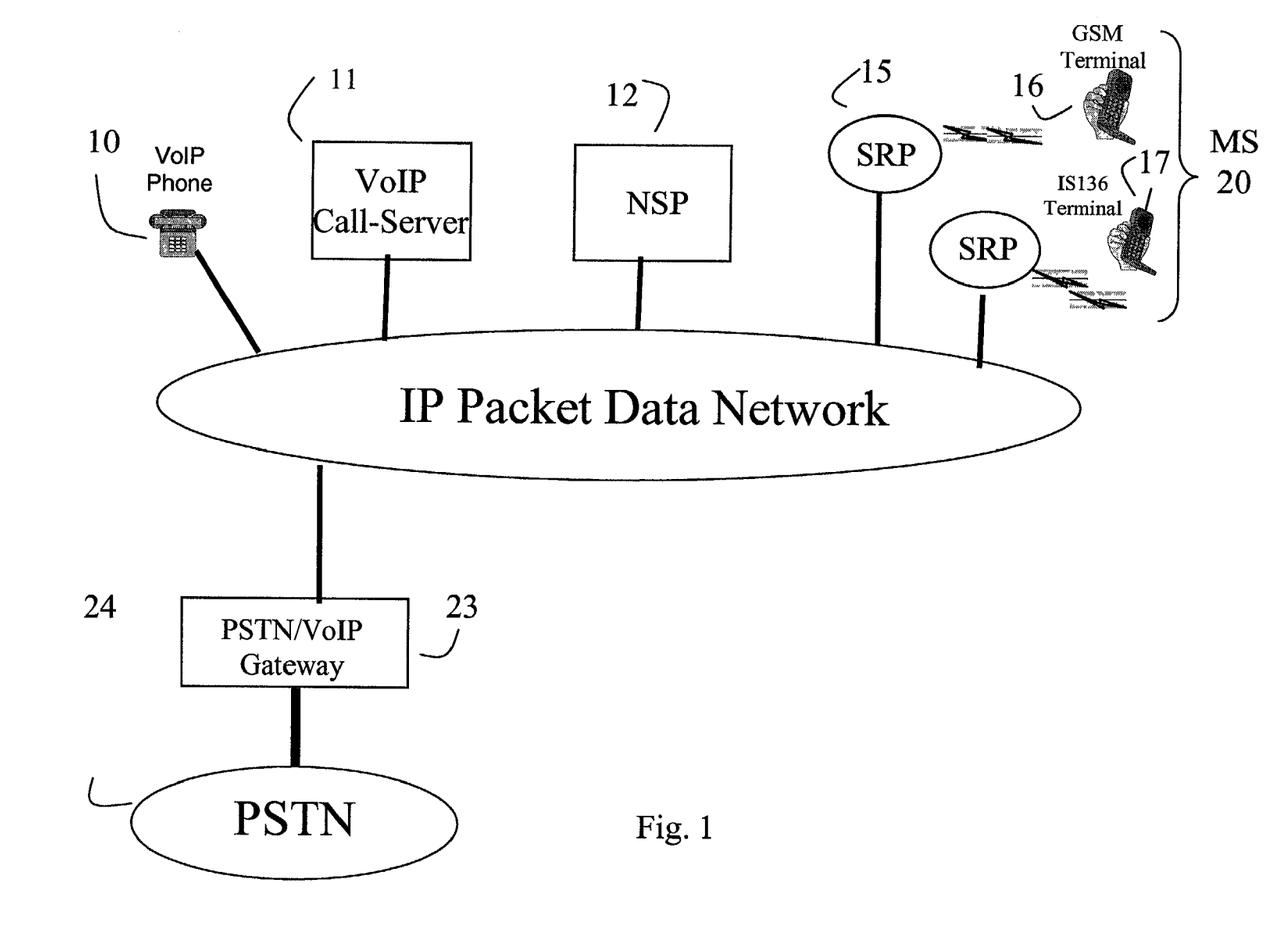
FIG. 1 illustrates an exemplary system architecture for the present invention.

FIG. 1 is a block diagram illustrating an exemplary embodiment of the present invention. A wireless terminal or mobile station (MS) 20 may be an IS-136 Terminal 17, a GSM terminal 16, etc. It is to be understood that the present invention is not so limited as a variety of capabilities may be used such as, but not limited to, GPRS-136 HS/EDGE, 802.11 wireless LAN, etc.

The wireless terminal or mobile station may communicate over the air with a Software Radio Port (SRP) 15. The SRP 15 combines functions of a traditional radio base station and a VoIP gateway (media and signaling gateway) to manage the air interface and packet network interface, respectively. These two interfaces are interconnected at the SRP 15.

A Network Server Platform (NSP) 12 may combine functions of a traditional Mobile Switching Center (MSC) and a VoIP call-server control capability.

The exemplary system illustrated in FIG. 1 may also contain a VoIP Call-Server 11. The VoIP Call-Server 11 is the call server for the VoIP network and may handle requests or messages from a VoIP client. The VoIP client may be, for example, a VoIP-enabled phone. The VoIP Call-Server 11 may also manage requests or messages from a VoIP Gateway. The VoIP Call-Server 11 works with the NSP to obtain proper routing information and forward received messages to desired destinations with/without modification on the messages.

A PSTN/VoIP Gateway 23 may also be used to interconnect the PSTN with the VoIP network. The Gateway 23 performs proper signaling and media conversion. Finally, a VoIP enabled phone, such as a SIP enabled phone, may be used. Although the exemplary embodiment demonstrates SIP to support the VoIP, the present invention is not so limited as any suitable VoIP protocol may be used such as H.323 to implement the VoIP service, for example.

Figure 2:
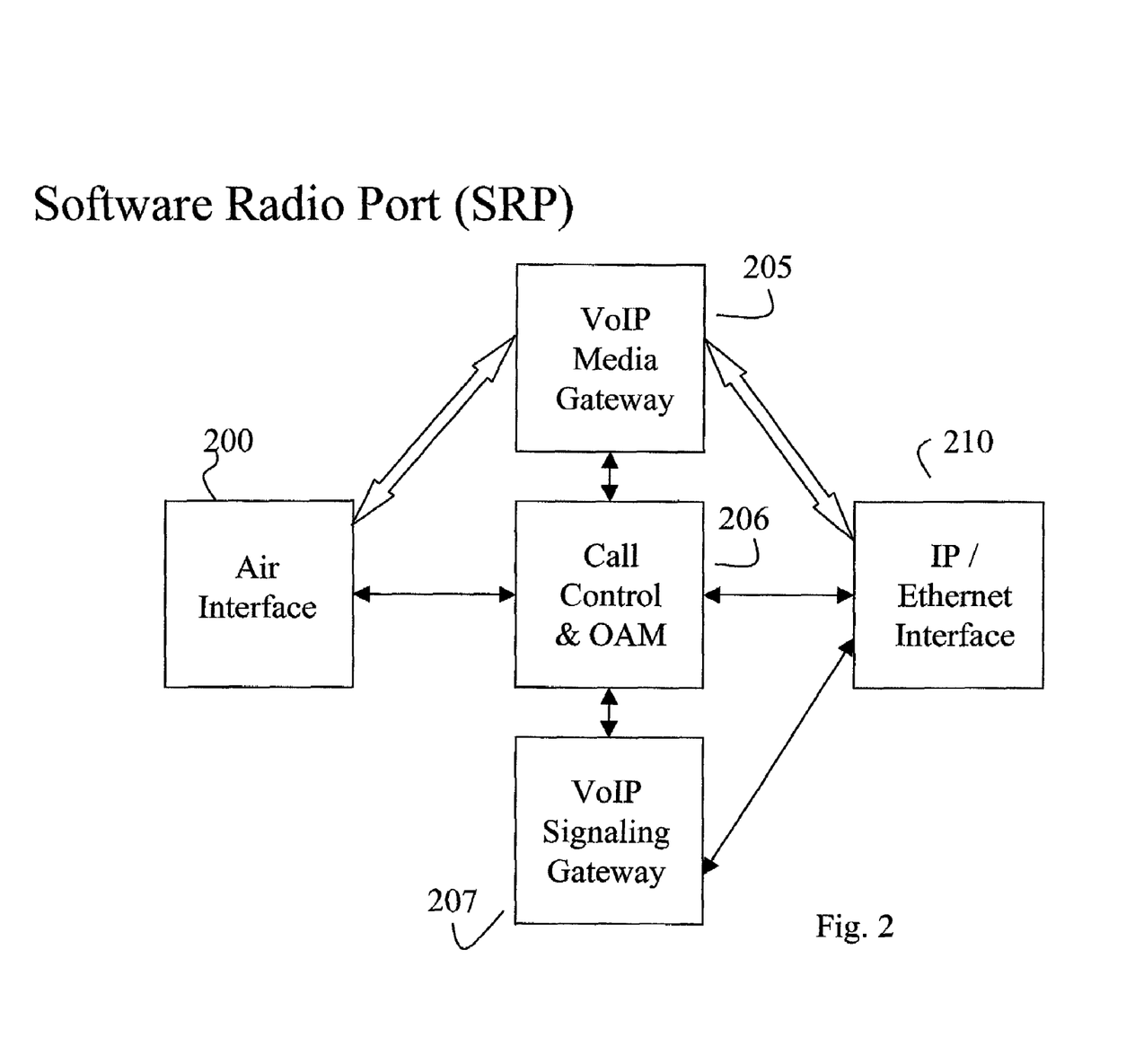
FIG. 2 is a block diagram illustrating an exemplary Software Radio Port (SRP) of the present invention.

FIG. 2 is a functional block diagram of an exemplary SRP 15. The air interface 200 may be an interface to support the IS-136 air interface for voice services. The SRP 15 may be further equipped with VoIP capability with a VoIP Media Gateway 205 and VoIP Signaling Gateway 207, and with an IP/Ethernet interface 210 that integrates the SRP 15 into the core packet data network for packet data service.

The VoIP Signaling Gateway may manage the VoIP call processing. It interconnects the mobile call control component with the VoIP call control. The VoIP Media Gateway 205 may perform voice codec translation. In an uplink direction, the input voice stream may be received at the air interface 200 and then forwarded to the VoIP Media Gateway 205. In the VoIP Media Gateway 205, the data is packetized and transported via the IP/Ethernet interface 210 to the desired destination. In the downlink direction, voice data packets may be received via the IP/Ethernet interface 210 at the VoIP Media Gateway 205. The data packets are converted and sent through the air interface 200 to the mobile station, such as a GSM terminal 16 or IS-136 Terminal 17.

The SRP 15 may further comprise a call control & OAM (Operation, Administration and Maintenance) 206. The call control component controls mobile call processing such as IS-136 call processing and coordinates with the VoIP signaling Gateway 207 for VoIP call related operations, such as requesting the VoIP signaling gateway 207 to set up a VoIP call while an IS-136 mobile is making a call. It also coordinates with the VoIP Media Gateway 205 such as in instructing the VoIP Media Gateway to set up an RTP media path at the proper call setup stage. The OAM component provides necessary functions to ensure the normal operation of the SRP 15.

Figure 3:
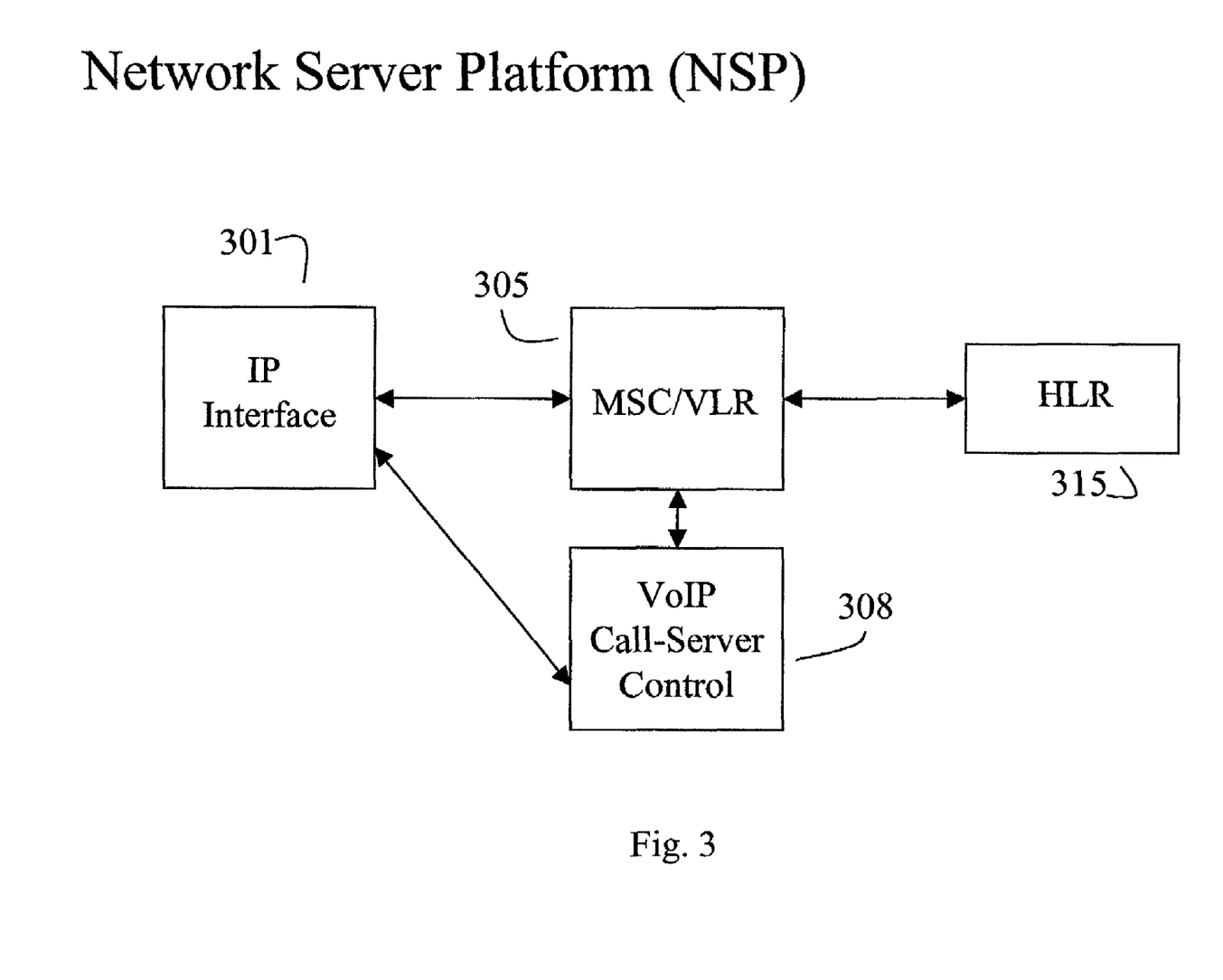
FIG. 3 is a block diagram illustrating an exemplary Network Server Platform (NSP) of the present invention.

FIG. 3 is a functional block diagram illustrating an exemplary Network Server Platform (NSP) 12, which may provide SRP control, call management, and mobility management. The NSP 12 may comprise a Mobile Switching Center/Visitors' Location Register (MSC/VLR) 305. The MSC/VLR 305 may perform call control-related operations for IS136 mobiles including but not limited to Mobile Station registration, call origination, call termination and handoff. The MSC/VLR 305 may manage the SRP 15. The MSC/VLR 305 may also manage the VoIP Call-Server 11 via the VoIP Call-Server Control 308.

The NSP 12 may further comprise a Home Location Register (HLR) 315, which is a mobile subscriber database and authentication center for caller verification. The HLR 315 may identify and/or verify a subscriber and may also contain a subscriber database related to features and services. The HLR also has the current mobile location information for each of the mobiles. The NSP 12 also contains a VoIP Call-Server Control 308, which controls VoIP call processing related operations in coordination with Mobile Switching Center (MSC) call control.

The NSP 12 may also comprise an IP interface 301 which may be an IP/Ethernet Interface that connects the NSP to the packet network. The IP interface 301 is responsible for MSC/VLR 305 to SRP 15 and VoIP Call-Server Control 308-to-VoIP Call-Server 11 communication.

The system and method of the present invention may be better understood through the following described exemplary embodiments. It should be noted that although the invention is described with reference to illustrative embodiments thereof, the present invention is not so limited and that numerous other modifications and embodiments may be devised.

Figure 4:
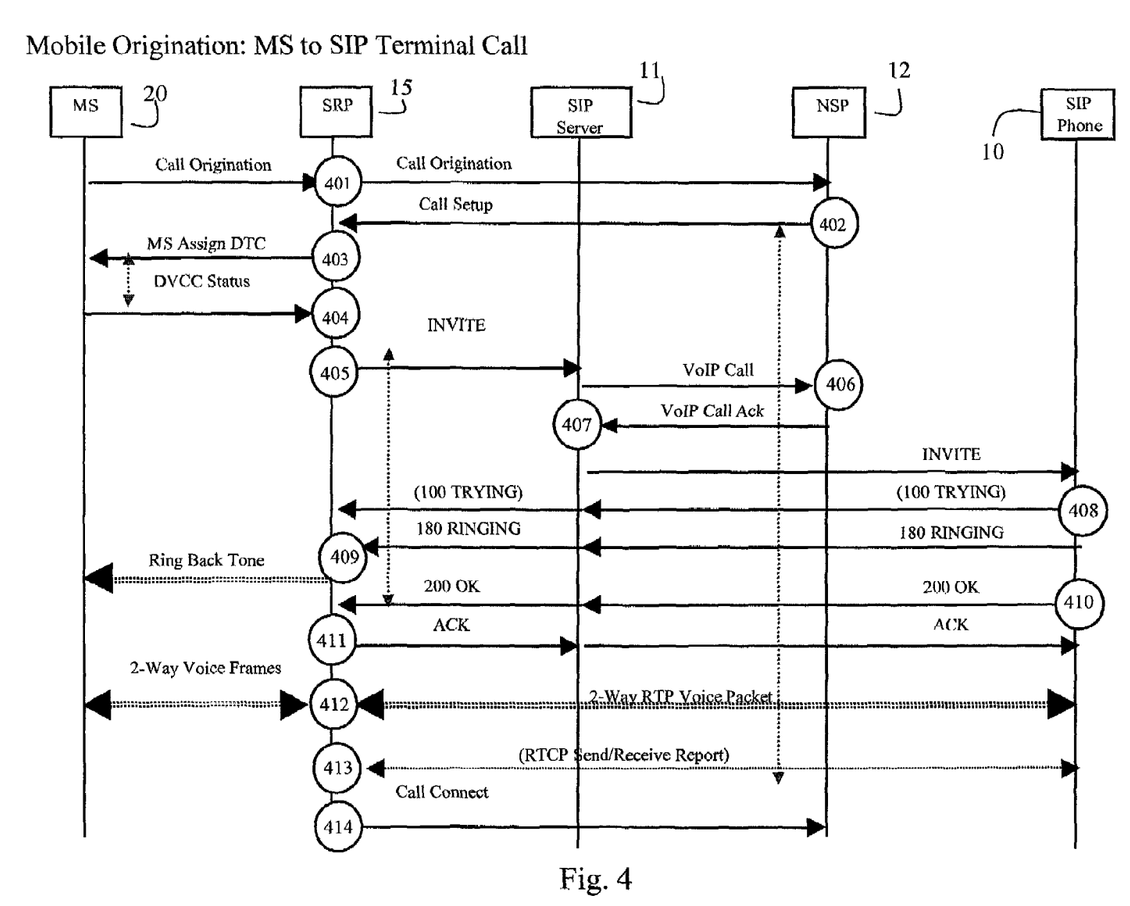
FIG. 4 illustrates an exemplary call processing procedure involving a call from a mobile station (MS) to a VoIP (SIP) terminal.

In one exemplary embodiment as illustrated in FIG. 4, a two-way RTP media path may be set up via an RTP pair of ports, i.e., one for RTP and the other for Real-Time Control Protocol (RTCP), between a VoIP Phone, such as the SIP phone 10, and the SRP 15. The RTP is for voice packets and RTCP is used to transmit control packets to participants from time to time regarding a particular RTP session. A two-way voice path is set up over the air between the SRP 15 and the Mobile Station (MS) 20. These two paths are interconnected at the SRP 15. In this example, a VoIP phone number is dialed at the MS 20, for example a wireless device such as a GSM Terminal 16 or IS-136 Terminal 17. The VoIP phone may be of any one of many VoIP phone, for example, Session Initiation Protocol (SIP) phone. Upon the dialing of the VoIP phone number, an IS-136 Call Origination Message, for example, may be sent to the SRP 15 which may forward the Call Origination message to the NSP 12 (step 401). The NSP 12 may respond with a Call Setup message to the SRP 15 (step 402) which may then send an IS-136 Digital Traffic Channel (DTC) Designation message to tune the Mobile Station (MS) 20 to the DTC (step 403). If the SRP 15 is unable to detect that the MS 20 is on the DTC, the call may be abandoned before any SIP-related message exchange occurs. After the SRP 15 detects the MS 20 as being on the DTC (step 404), the SRP 15 sends a SIP INVITE message to the SIP server 11 (step 405). If there is no response to the INVITE message from the SRP 15, the SRP 15 may time out and re-send the message.

The SIP server 11 may announce the incoming call to the NSP 12 (step 406), which may analyze the called number and realize it is not a mobile subscriber. The NSP 12 may respond back to the SIP server (step 407) which may then analyze the number and realize it is a local phone and forward the INVITE message to the called VoIP phone such as the SIP phone 10. The SIP phone 10 may optionally respond to the INVITE message with a SIP 100 TRYING message. The SIP phone may then send a 180 RINGING message to the SIP Server 11 which then may relay the message to the SRP 15 (step 408). The SRP 15 may then generate a ring back tone, which may be heard at the MS 20 (step 409).

When the SIP phone 10 is answered, an SIP 200 OK message may be sent to the SIP server 11 which then may forward the message to the SRP 15 (step 410). The SRP 15 may respond with an ACK message and may then set up the RTP ports for sending and receiving the RTP/RTCP packets (step 411).

Thus, a two-way RTP media path is set up between the SIP Phone 10 and the SRP 15. The SRP 15 then interconnects the RTP path with the two-way digital traffic channel between the SRP 15 and the MS 20 so that an end-to-end voice path between the MS 20 and SIP phone 10 has been established. The SRP 15 may exchange optional send/receive Real Time Control Protocol (RTCP) reports with the SIP phone 10 (step 413) and may send Call Connect messages to the NSP 12 (step 414). If the SIP phone 10 is busy, a SIP 4xx Failure message may be sent to the SRP 15 which may disconnect the call. If the SIP phone 10 does not answer, the SRP 15 may time out on receiving the OK message and may send a SIP 4xx Failure message to the SIP Server 11 and disconnect the call.

Figure 5:
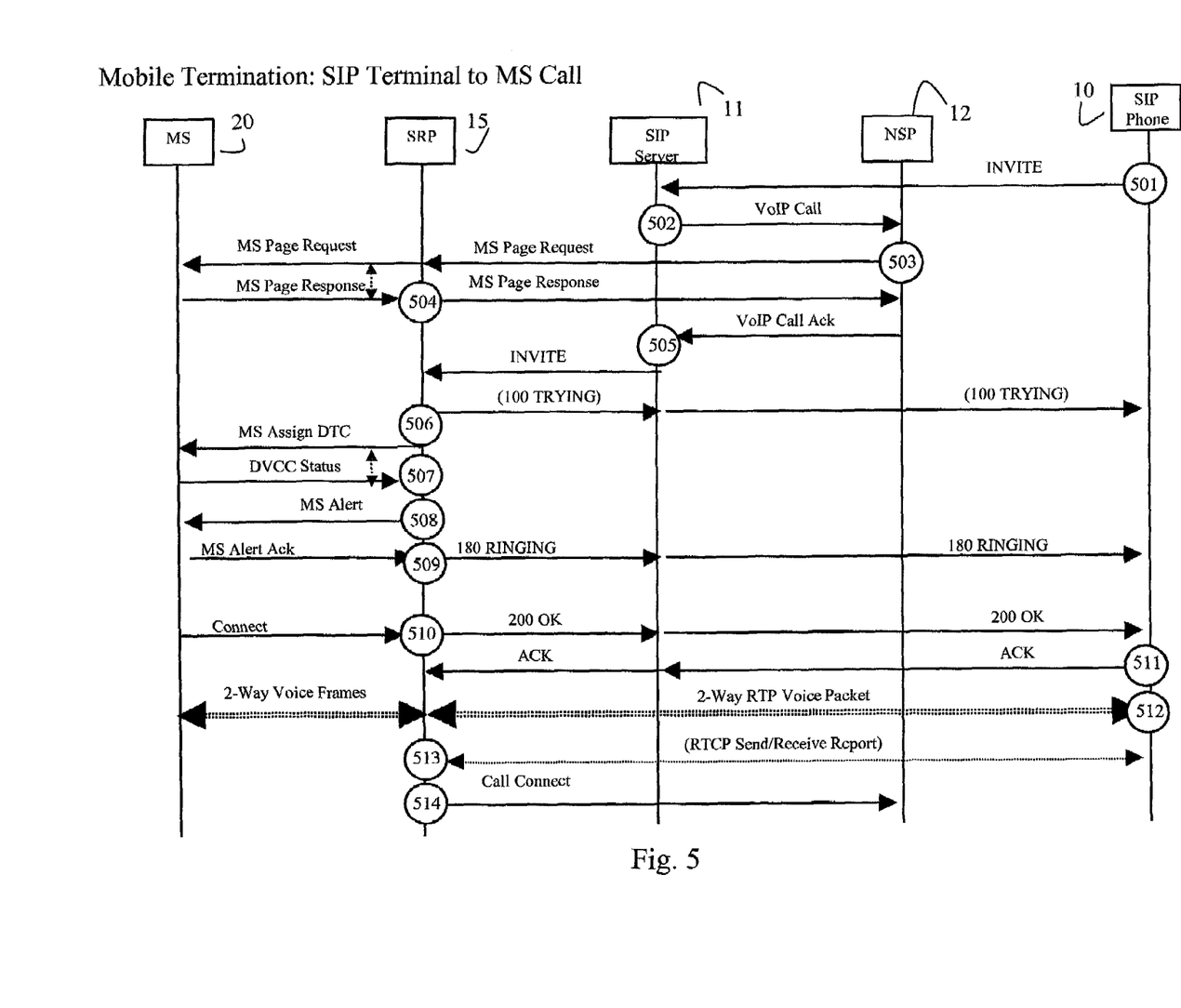
FIG. 5 illustrates an exemplary call processing procedure involving a call from a VoIP (SIP) terminal to a mobile station (MS).

In another exemplary embodiment as illustrated in FIG. 5, a two-way voice path is established between a VoIP phone, such as a SIP phone 10, and a mobile station (MS) 20 via a SRP 15, wherein the call originates at the VoIP phone (i.e., SIP phone) and terminates at the MS 20. In this example, a VoIP phone, for example a SIP phone 10, may place a call to a mobile station (MS) 20 by sending an INVITE message to a VoIP call-server (illustrated in FIG. 5 as a SIP server 11) (step 501). The SIP server 11 may send a message containing the called number to the NSP 12 (step 502). The NSP 12 may then analyze the called number and realize that the called number is a registered mobile station covered by the SRP 15 and may send a page request message to the SRP 15. The SRP 15 may then forward the page request message to the MS 20 (step 503) and may also send back a page response received from the MS 20 to the NSP 12 (step 504). The page request may be an IS-136 message but is not so limited. If the MS 20 does not respond to the page request message, the SRP 15 may time out and notify the SIP Server 11 through the NSP 12. In this case, the SIP Server 11 may abandon the call and may send a SIP 4xx Failure message to the calling SIP phone 10. However, if the MS 20 properly responds to the page request message, the NSP 12 may then instruct the SIP server 11 to send the INVITE message to the SRP 15 (step 505), which may optionally respond with a SIP 100 TRYING message to the SIP phone 10 (step 506). The SRP 15 further sends Digital Traffic Channel (DTC) Designation messages to the MS 20, such as but not limited to IS-136 messages, and may detect when the MS 20 is tuned to the DTC (step 507). If the SRP 15 cannot detect that the MS 20 is on the DTC, the call may be abandoned and the SRP 15 may send a SIP 4xx Failure message to the SIP server 11. However, when the MS 20 is on the DTC and is detected as being on the DTC, the SRP 15 may send an alert message (such as an IS-136 alert) to the MS 20 (step 508). The SRP 15 receives an ACK message from the MS 20 and sends a SIP 180 RINGING message to the SIP Server 11. The SIP server 11 may then forward the 180 RINGING message to the SIP phone 10 (step 509). When the MS 20 answers the call, the SRP 15 may then send an SIP 200 OK message to the SIP server 11, which forwards the SIP 200 OK message to the SIP phone 10 (step 510). The SIP phone 10 may then send an ACK message to the SIP Server 11 (step 511) and a two-way voice path is established. The two parties, i.e. the SIP phone 10 and the SRP 15 may then exchange optional Real Time Control Protocol (RTCP) send/receive reports (step 513) and the SRP 15 may send a CONNECT message to the NSP 12 (step 514).

Figure 6:
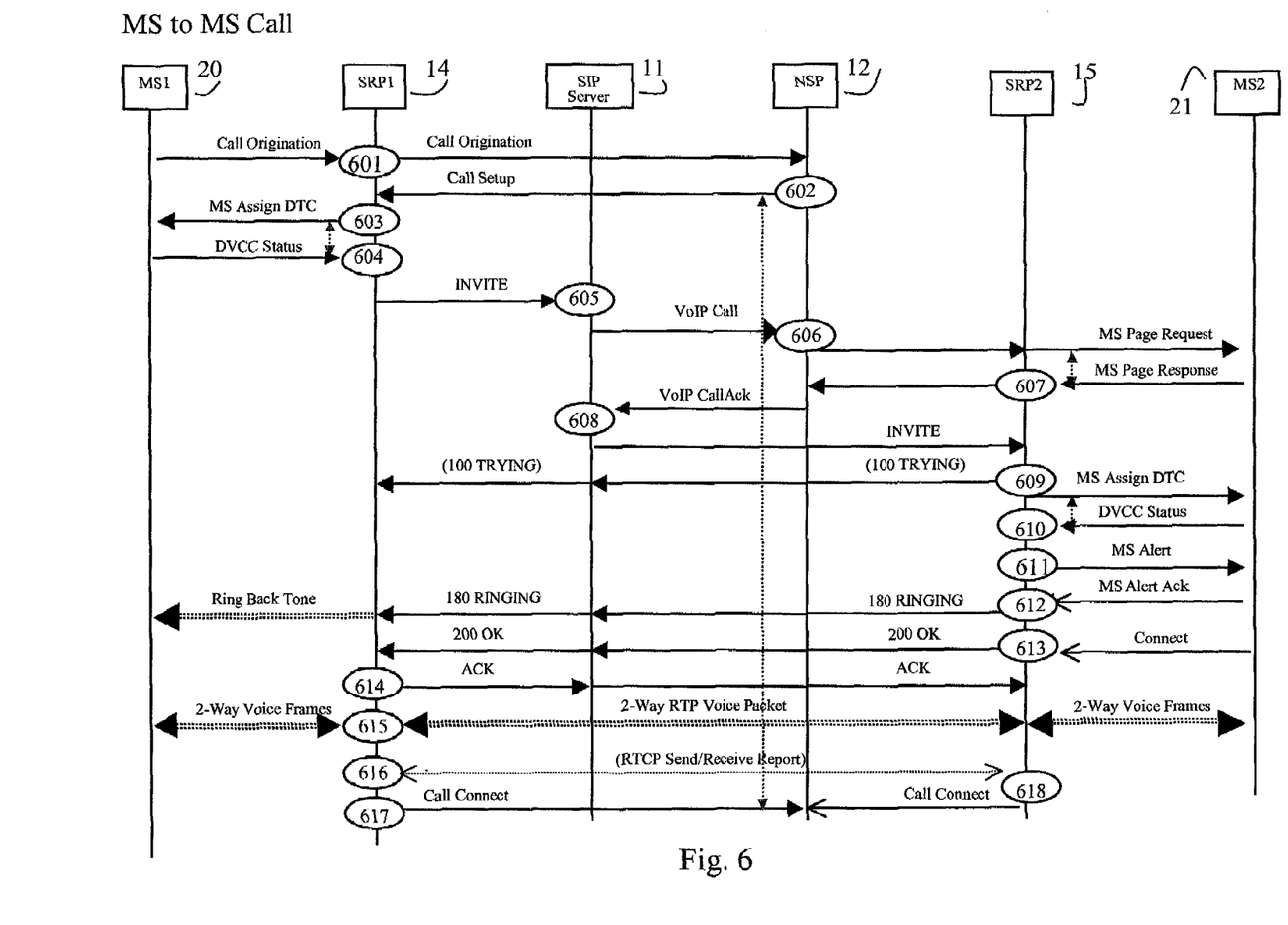
FIG. 6 illustrates an exemplary call processing procedure involving a call from a mobile station (MS1) to another mobile station (MS2).

In the exemplary embodiment illustrated in FIG. 6, the exemplary embodiment of FIG. 4 and FIG. 5 are combined such that both the calling party and the called party are mobile stations (MS1 20 and MS2 21, respectively). The calling MS1 20 and called MS2 21 may be registered either on the same or different SRPs, such as SRP1 14 and SRP2 15. In this example, one mobile station (MS1) 20 initiates a call by sending a call origination message to a first SRP (SRP1) 14. SRP1 14 processes and transmits the call origination message to the NSP 12, which responds by returning a call setup message back to the SRP1 14 (step 602). SRP1 14 further sends Digital Traffic Channel (DTC) Designation messages to the MS1 20, such as but not limited to IS-136 messages, and may detect when the MS1 20 is tuned to the DTC (step 604). If the SRP1 14 cannot detect that the MS1 20 is on the DTC, the call may be abandoned. Otherwise, when the MS1 20 is on the DTC and is detected as being on the DTC, SRP1 14 may send an INVITE message to the SIP Server (step 605). The SIP server 11 may announce the incoming call to the NSP 12 (step 606). The NSP 12 may then analyze the called number and realize that the called number is a registered mobile station covered by a second SRP (SRP2) 15 and may send a page request message to the SRP2 15. SRP2 15 may then forward the page request message to the second mobile station (MS2) 21 (step 606) and may also send back a page response received from the MS2 21 to the NSP 12 (step 607). The page request may be an IS-136 message but is not so limited. If the MS2 21 does not respond to the page request message, the SRP2 15 may time out and notify the SIP Server 11 through the NSP 12. In this case, the SIP Server 11 may abandon the call and may send a SIP 4xx Failure message to the calling SRP 114. However, if the MS2 21 properly responds to the page request message, the NSP 12 may then instruct the SIP server 11 to send the INVITE message to the SRP2 15 (step 608), which may optionally respond with a SIP 100 TRYING message to the SIP server 11 (step 609). The SRP2 15 further sends Digital Traffic Channel (DTC) Designation messages to the MS2 21, such as but not limited to IS-136 messages, and may detect when the MS2 21 is tuned to the DTC (step 610). If the SRP2 15 cannot detect that the MS2 21 is on the DTC, the call may be abandoned and the SRP2 15 may send a SIP 4xx Failure message to the SIP server 11 (not shown). However, when the MS2 21 is on the DTC and is detected as being on the DTC, the SRP2 15 may send an alert message (such as an IS-136 alert) to the MS2 21 (step 611). The SRP2 15 receives an ACK message from the MS2 21 and sends a SIP 180 RINGING message to the SIP Server 11. The SIP server 11 may then forward the SIP 180 RINGING message to the SRP1 14 (step 612), which generates and sends a ring back tone to the MS1 20. When MS2 21 is answered, the SRP2 15 sends an SIP 200 OK message to the SIP server 11, which then may forward the message to the SRP1 14 (step 613). The SRP1 14 may respond with an ACK message and may then set up the RTP ports for sending and receiving the RTP packets (step 614). Thus, the two-way voice path is set up between the MS1 20 and the MS2 21 via SRP1 14 and SRP2 15 (step 615). This two-way voice path consists of: two-way digital traffic channel between MS1 20 and SRP 114, two-way RTP path between the SRP1 14 and SRP2 15, and two-way digital traffic channel between MS2 21 and SRP2 15. The SRP1 14 may exchange optional send/receive Real Time Control Protocol (RTCP) reports with the SRP2 15 (step 616) and both may send Call Connect messages to the NSP 12, that is, SRP1 14 may send Call Connect messages to the NSP 12 (step 617) and SRP2 15 may send Call Connect messages to the NSP 12 (step 618).

Figure 7:
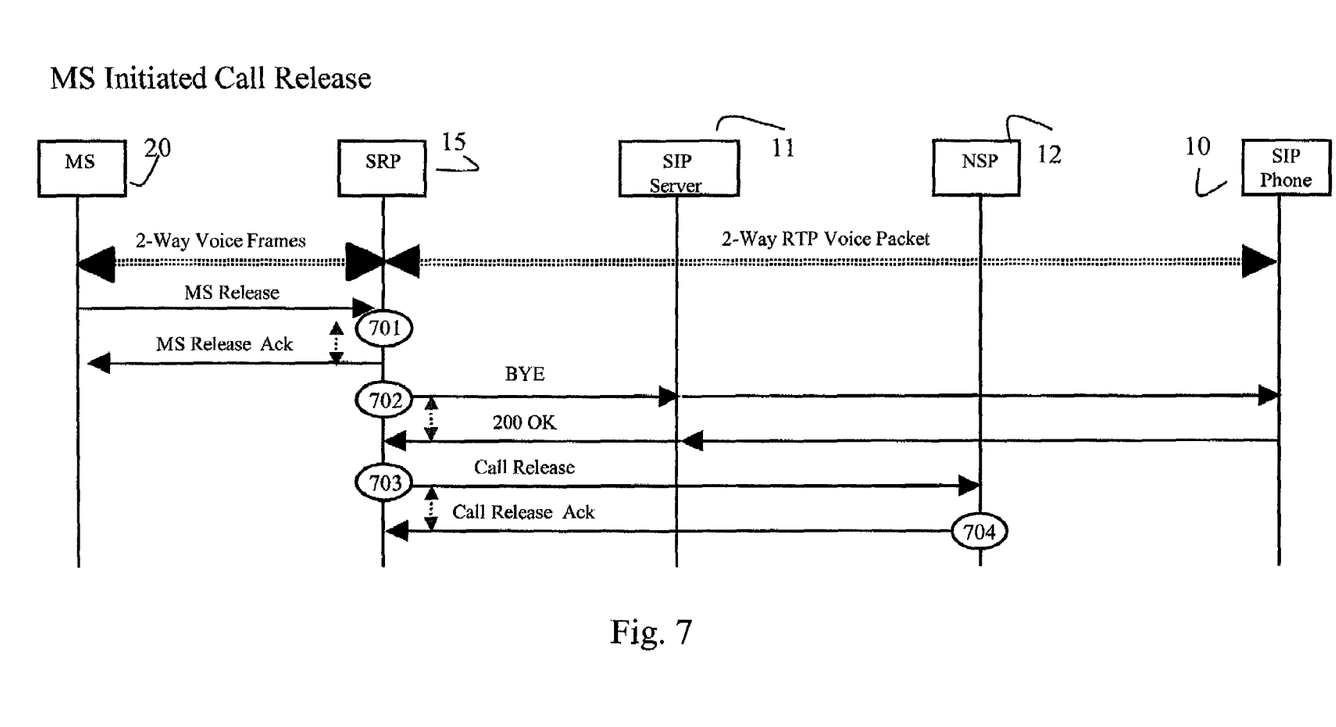
FIG. 7 illustrates an exemplary call processing procedure involving mobile station (MS)-initiated call release.

In another exemplary embodiment illustrated in FIG. 7, a call is disconnected by the mobile station (MS) 20. In this example, the mobile station (MS) 20 hangs up and an IS-136 release message, for example, may be sent to the SRP 15 which responds with a IS-136 Base Station ACK message and releases the radio resource and the RTP media path (step 701). The SRP 15 also may send a SIP BYE message to a VoIP call-server, in this case, the SIP server 11, which may pass the BYE message to a VoIP phone, such as the SIP phone 10 (step 702). The SIP phone 10 may respond by ending the call and returning a SIP 200 OK message to the SRP 15 (step 702) via the SIP Server 11. After receiving the 200 OK message, the SRP 15 sends a Call Release message to the NSP 12, which may then update the call state of the MS 20 (step 703). Alternatively, if the SIP 200 OK message is not received at the SRP 15 after sending the BYE message, the SRP 15 will time out after a predetermined period of time and may send a call Release message to the NSP 12 after the predetermined period of time has elapsed. The NSP 12 may then send an acknowledge message back to the SRP 15 (step 704). If the acknowledge message is not received at the SRP 15, the SRP 15 may try again for a predetermined number of times.

Figure 8:
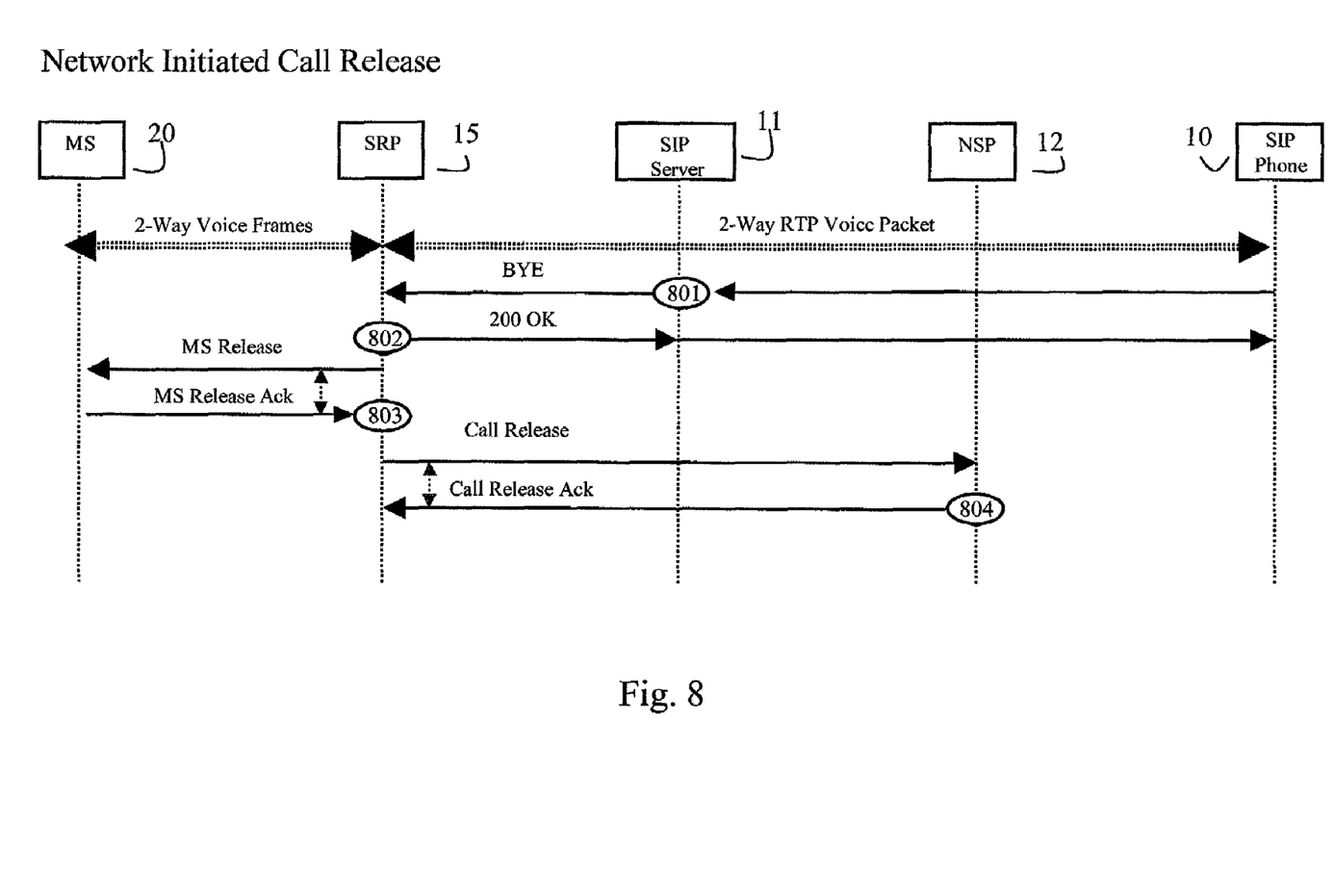
FIG. 8 illustrates an exemplary call processing procedure involving network-initiated call release.

In another exemplary embodiment as illustrated in FIG. 8, call disconnection is initiated in the network. Such may occur, for example, when the party from the network side decides to disconnect the call or when the SIP server decides to release the call due to error or other various reasons. In this example, the VoIP call-server or SIP Server 11 receives a BYE message from the SIP Phone 10 and forwards the message to the SRP 15 (step 801). The SRP 15 receives the BYE message and responds with a SIP 200 OK message to the SIP server 11, disconnects the RTP media path, and sends an MS release message (e.g., an IS-136 release message) to the mobile station (MS) 20 (step 802). After receiving the ACK message from the mobile station, the SRP 15 sends a Call Release message to the NSP 12 (step 803) which returns an acknowledge message (step 804). If the SRP 15 does not receive the acknowledge message from the MS 20, the SRP 15 may continue to re-try a predetermined number of times. Also, if the SRP 15 does not receive the acknowledge message from the NSP 12, the SRP 15 may re-try a predetermined number of times.

Figure 9:
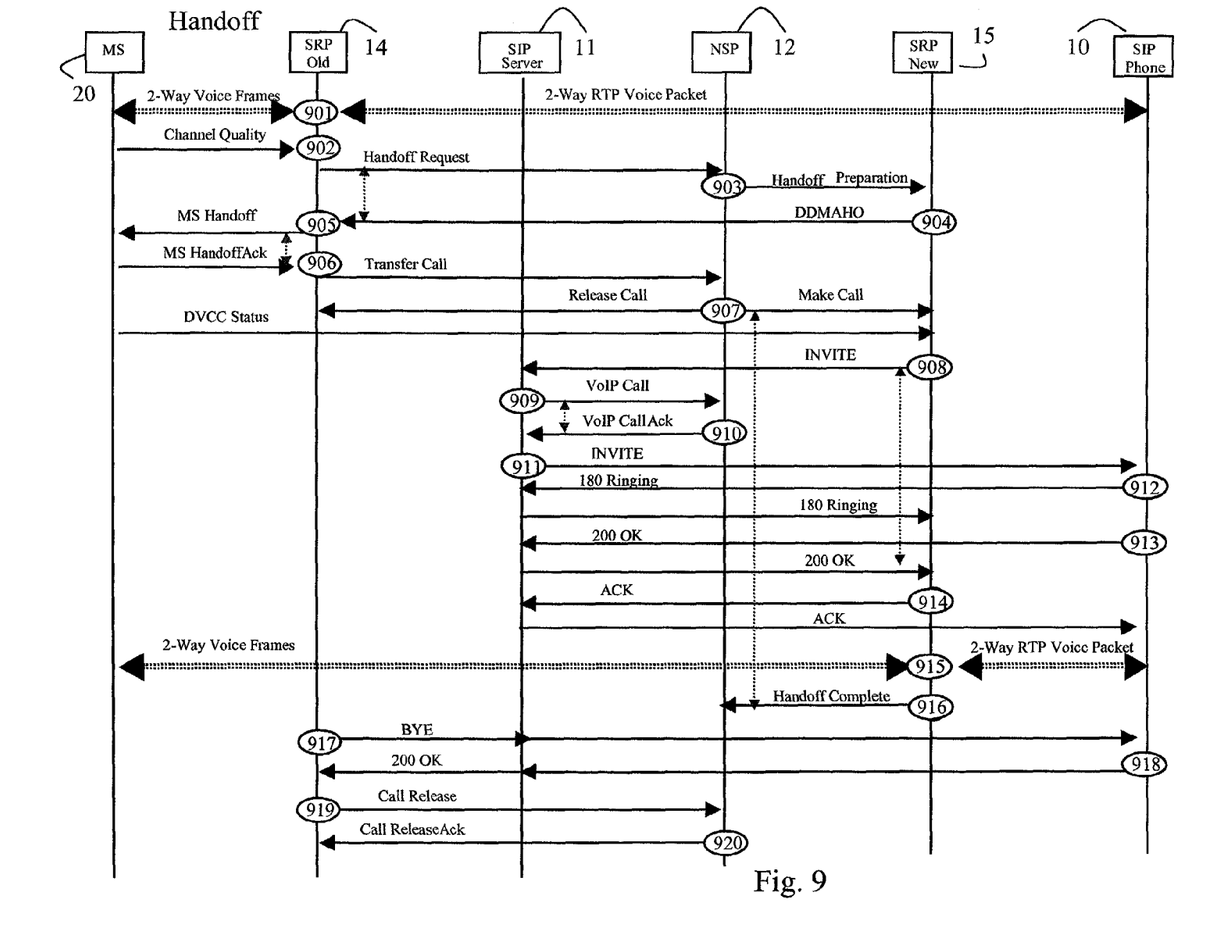
FIG. 9 illustrates an exemplary call processing procedure involving mobile handoff.

In another exemplary embodiment of the present invention as illustrated in FIG. 9, a call is handed off from an old SRP 14 to a new SRP 15. In this example, the mobile station (MS) 20, while engaged with a party within range of the old SRP 14, moves out of range of the old SRP 14 and into range of the new SRP 15. Channel quality messages being sent to the old SRP 14 from the MS 20 may indicate that the error rate has reached the handoff point (step 901)—i.e., because the MS 20 is moving out of range of the old SRP 14, the channel quality is attenuating to the point that handoff should occur to maintain the connection. At this point, the old SRP 14 may then send a Handoff Request message along with a list of handoff candidates (the Mobile Assisted Hand-Off list—MAHO list, for example) to the NSP 12 (step 902). Using MAHO as an example, the MS 20 may assist in assigning a voice channel by reporting its surrounding base stations' signal strengths to the current base station, for example. The NSP 12 may then verify the availability of a resource from the MAHO list, for example, and may send a Handoff Preparation message to a new SRP 15 (step 903). The NSP 12 may abort the handoff if no available resources are identified. If resources are available, however, the new SRP 15 may activate a new traffic channel and then send a message to the old SRP 14 to handoff the mobile station (MS) 20 to the new traffic channel (step 904). After receiving the message from the new SRP 15, the old SRP 14 sends a Handoff message to the MS 20 (step 905) (i.e., an IS-136 Dedicated DTC handoff message), which responds back an ACK to the old SRP 14. If the old SRP 14 does not receive this ACK response, however, the old SRP 14 may send a handoff failure message to the NSP 12 and the NSP 12 may inform the new SRP 15 to release allocated resources. However, if the response is received at the old SRP 14, the old SRP 14 may then instruct the NSP 12 to transfer the call to the new SRP 15 and may also deactivate the traffic channel and release other resources (step 906). The NSP may then send a message to the new SRP 15 for a conference VoIP call and also may send a message to the old SRP 14 to release the VoIP call (step 907). When the new SRP 15 detects that the MS 20 is on the new traffic channel, it may then send a SIP INVITE message to the SIP server 11 (step 908) which may send a message to NSP 12 for called number analysis (step 909). The NSP 12 analyzes the called number and responds back to the SIP server 11 after it realizes that the called number is not a mobile station (step 910). The SIP server 11 further finds out if the called number is a local SIP phone and forwards the INVITE message to the SIP phone 10 (step 911) which sends back a 180 RINGING message. The SIP server 11 relays the 180 RINGING message to SRP 15 (step 912). The new SRP 15 does not generate a ring back tone. The SIP phone 10 may send a SIP OK message to the SIP server 11 which forwards it to the SRP 15 (step 913). The SRP 15 may respond with a SIP 200 ACK message back to the SIP Server 11 which forwards it to the SIP phone 10 (step 914). A voice path between the MS 20 and the SIP Phone 10 is established and is interconnected by the new SRP 15 (step 915). The new SRP 15 may send a message to the NSP 12 to indicate that the handoff is complete (step 916). The old SRP 14 receives the Release old Call message from the NSP 12 and may then send a BYE message to the SIP phone 10 via the SIP server 11 (step 917). The SIP phone 10 returns a SIP 200 OK message (step 918) and the old SRP 14 sends a CALL Release message to inform the NSP 12 that the call has been released by the old SRP 14 (step 919). The NSP 12 acknowledges with an ACK message (step 920).

Figure 10:
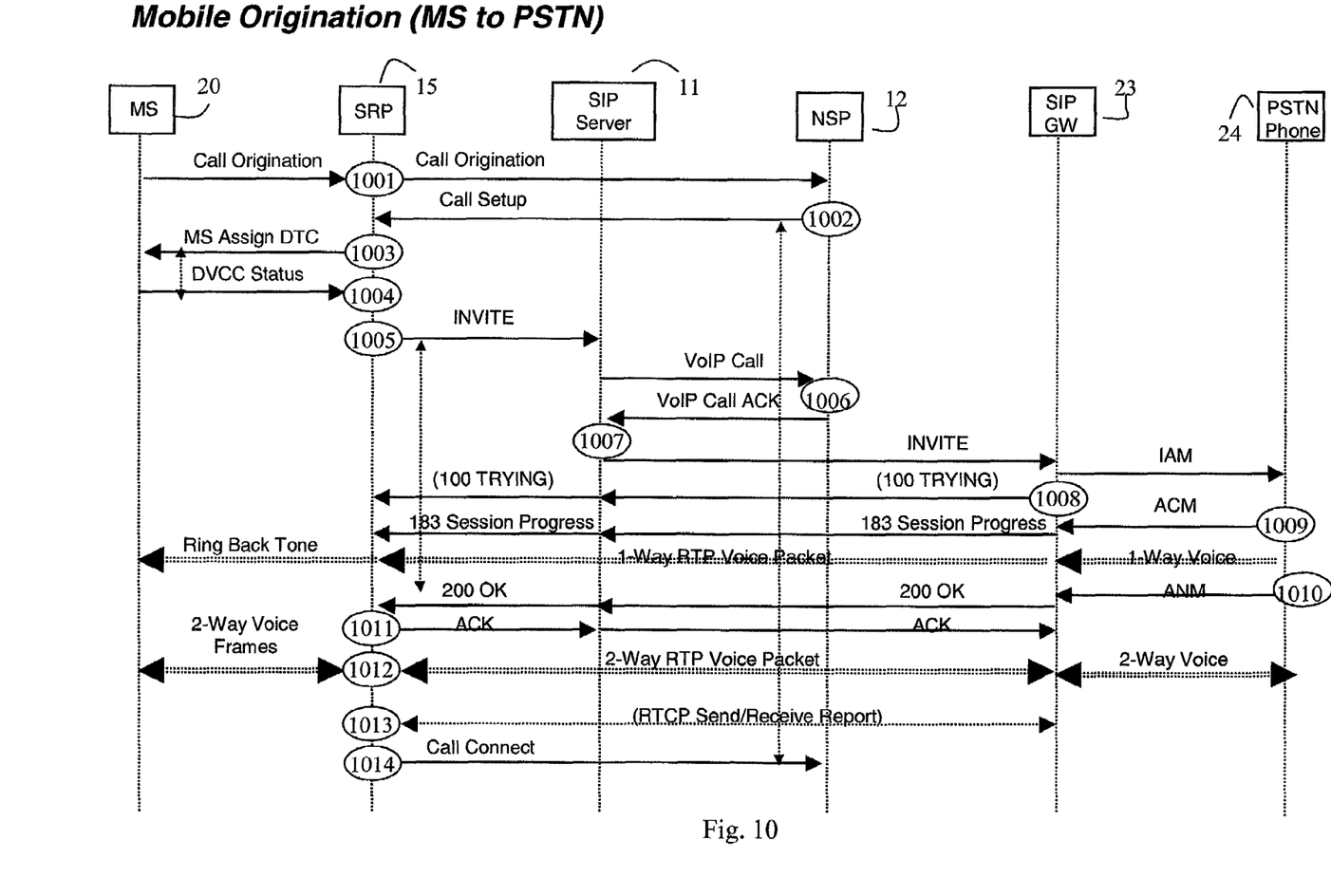
FIG. 10 illustrates an exemplary call processing procedure involving a call from a mobile station (MS) to a phone in the Public Switched Telephone Network (PSTN).

In another exemplary embodiment of the present invention illustrated in FIG. 10, a two-way voice path may be set up between a telephony network such as a Public Switched Telephone Network, such as a PSTN phone 24, and the Mobile Station (MS) 20 via the SRP 15 with the call originating from the Mobile Station (MS) 20. It is understood that although the illustrative embodiment demonstrates a voice path between a phone in the PSTN network and a mobile station, the present invention is not so limited and may be used with any telephony network including Private Branch Exchange system (PBX), for example. In this example, a phone number is dialed at the MS 20, for example a wireless device such as a GSM Terminal 16 or IS-136 Terminal 17. Upon the dialing of the phone number, a Call Origination Message, for example an IS-136 call origination message, may be sent to the SRP 15 which may forward the Call Origination message to the NSP 12 (step 1001). The NSP 12 may respond with a Call Setup message to the SRP 15 (step 1002) which may then send a Digital Traffic Channel (DTC) Designation message (e.g., an IS-136 Digital Traffic Channel) to effect tuning of the Mobile Station (MS) 20 to the DTC (step 1003). After the SRP 15 detects the MS 20 as being on the DTC (step 1004), the SRP 15 sends a SIP INVITE message to the SIP server 11 (step 1005). However, if the SRP 15 is unable to detect that the MS 20 is on the DTC, the call may be abandoned before any SIP-related message exchange occurs. Also, if there is no response to the INVITE message from the SRP 15, the SRP 15 may time out and re-send the message several times.

The SIP server 11 may announce the incoming call to the NSP 12 (step 1006), which may analyze the called number. The NSP 12 realizes the called number is not a subscriber and responds back to the SIP server. The SIP server 11 further analyzes the called number and realizes it is not a local phone number. The SIP server 11 then forwards the INVITE message to a SIP Gateway 23 where all necessary SIP/PSTN interworking functions are performed (step 1007). Call processing occurs in the PSTN after an IAM (Initial Address Message) message is received at the PSTN from the SIP Gateway. The SIP Gateway 23 may further respond to the INVITE message by sending a SIP 100 TRYING message to the SIP Server 11 (step 1008) or may receive an ACM (Address Complete Message) message (step 1009) from the PSTN phone 24 and send a SESSION PROGRESS message to the SIP Server 11 which may relay these messages to the SRP 15. Also a one-way voice path is established from the PSTN phone 24 to the MS 20 via the SIP Gateway 23 and SRP 15 so that a ring back tone may be heard at the MS 20.

When the PSTN phone 24 is answered, an ANM (Answer Message) message may be sent to the SIP Gateway 23 (step 1010) which then may send an OK message to the SIP Server 11 which may relay the message to the SRP 15. The SRP 15 may respond with an ACK message and may then set up the RTP ports for sending and receiving the RTP packets (step 1011).

Thus, the two-way voice path is set up between the PSTN phone 24 and the MS 20 via the SIP Gateway 23 and SRP 15 (step 1012). The SRP 15 may exchange optional send/receive Real Time Control Protocol (RTCP) reports with the SIP Gateway 23 (step 1013) and may send Call Connect messages to the NSP 12 (step 1014). If the PSTN phone 24 is busy, a SIP 4xx Failure message may be sent to the SRP 15, which may disconnect the call. If the PSTN phone 24 does not answer, the SRP 15 may time out on receiving the 200 OK message and may send a SIP 4xx Failure message to the SIP Server 11 and disconnect the call.

Figure 11:
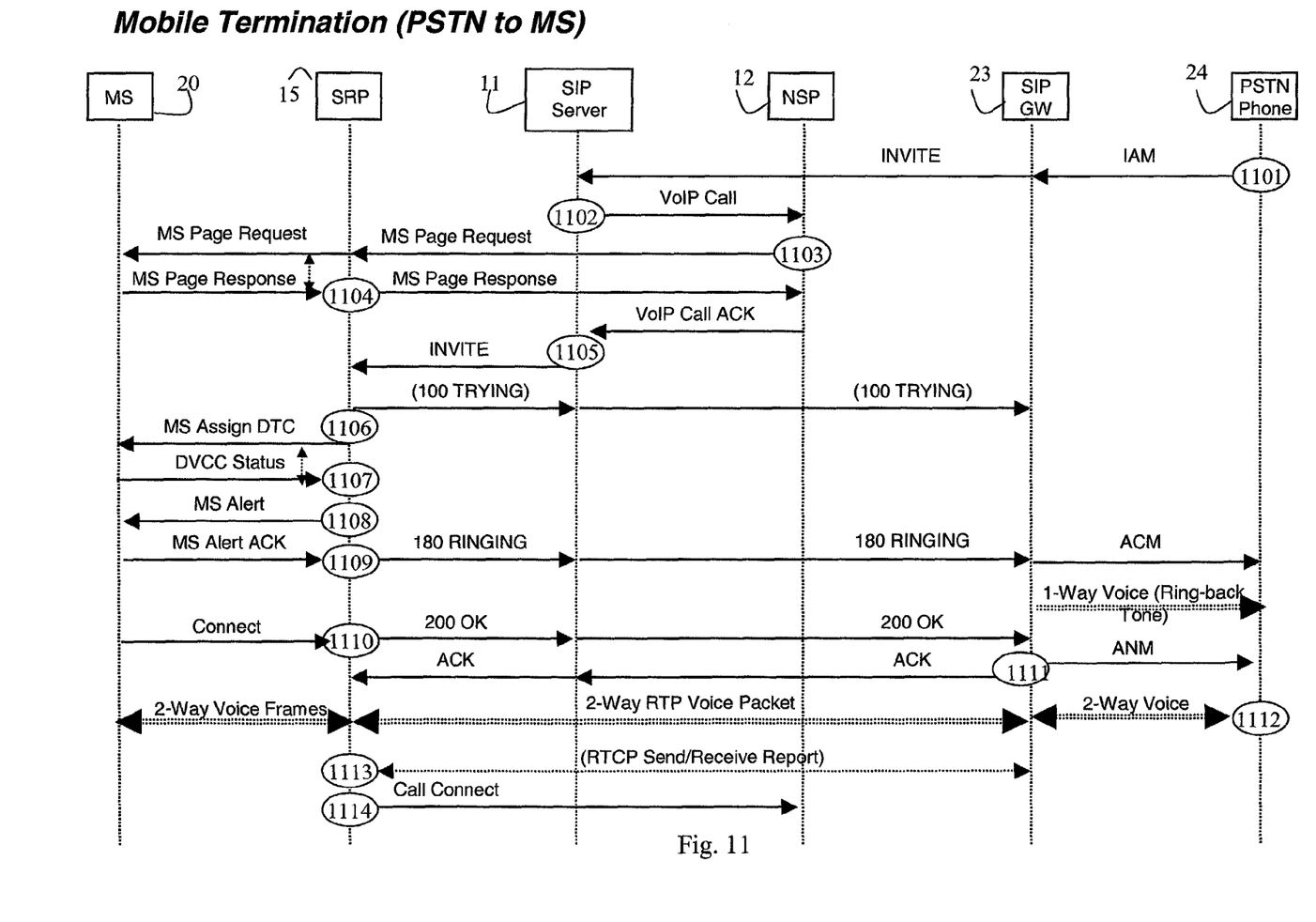
FIG. 11 illustrates an exemplary call processing procedure involving a call from a phone in the Public Switched Telephone Network (PSTN) to a mobile station (MS).

In another exemplary embodiment as illustrated in FIG. 11, a two-way voice path is established between a PSTN phone 24 and a mobile station (MS) 20 wherein the call originates at the PSTN phone 24 and terminates at the MS 20. It is understood that although the illustrative embodiment demonstrates a voice path between a phone in the PSTN and a mobile station, the present invention is not so limited and may be used with any telephony network including Private Branch Exchange system (PBX), for example. In this example, a call is placed to a mobile station (MS) 20 via a VoIP Gateway (such as but not limited to a SIP Gateway 23 as illustrated in FIG. 11) by sending an IAM message from the PSTN phone 24 to the SIP Gateway 23 which then sends an INVITE message to a VoIP call-server (illustrated in FIG. 11 as SIP server 11) (step 1101). The SIP server 11 may send a message containing the called number to the NSP 12 (step 1102). The NSP 12 may then analyze the called number and realize that the called number is a registered mobile station covered by the SRP 15 and may send a page request message to the SRP 15. The SRP 15 may then forward the page request message to the MS 20 (step 1103) and may also send back a page response received from the MS 20 to the NSP 12 (step 1104). The page request may be an IS-136 message but is not so limited. If the MS 20 does not respond to the page request message, the SRP 15 may time out and notify the SIP Server 11 through the NSP 12. In this case, the SIP Server 11 may abandon the call and may send a SIP 4xx Failure message to the calling SIP Gateway 23. Otherwise, if the MS 20 properly responds to the page request message, the NSP 12 may then instruct the SIP server 11 to send the INVITE message to the SRP 15 (step 1105), which may optionally respond with a SIP 100 TRYING message to the SIP Server 11 which then forwards the message to the SIP Gateway 23 (step 1106). The SRP 15 further sends Digital Traffic Channel (DTC) Designation messages to the MS 20, such as but not limited to IS-136 messages, and may detect when the MS 20 is tuned to the DTC (step 1107). If the SRP 15 cannot detect that the MS 20 is on the DTC, the call may be abandoned and the SRP 15 may send a SIP 4xx Failure message to the SIP server 11 (not shown). Otherwise, when the MS 20 is on the DTC and is detected as being on the DTC, the SRP 15 may send an alert message (such as an IS-136 alert) to the MS 20 (step 1108). The SRP 15 receives an ACK message from the MS 20 and sends a SIP 180 RINGING message to the SIP Server 11. The SIP server 11 may then forward the 180 RINGING message to the SIP Gateway 23 (step 1109), which sends an ACM message to the PSTN phone 24. When the MS 20 answers the call, the SRP 15 may then send an OK message to the SIP server 11 (step 1110) which forwards the OK message to the SIP Gateway 23. The SIP Gateway 23 then sends an ANM message to the PSTN phone 24. The SIP Gateway 23 sends an ACK message to the SIP Server 11 which then forwards the ACK message to the SRP 15 (step 1111) and a two-way voice path is established. The SIP Gateway 23 and the SRP 15 may then exchange optional Real Time Control Protocol (RTCP) send/receive reports (step 1113) and the SRP 15 may send a CONNECT message to the NSP 12 (step 1114).

This concludes the description of the example embodiments. Although the present invention has been described with reference to illustrative embodiments thereof, it should be understood that numerous other modifications and embodiments can be devised by those skilled in the art that will fall within the scope and spirit of the principles of the invention. More particularly, reasonable variations and modifications are possible in the component parts and/or arrangements of the subject combination arrangement within the scope of the foregoing disclosure, the drawings and the appended claims without departure from the spirit of the invention. In addition to variations and modifications in the component parts and/or arrangements, alternative uses will also be apparent to those skilled in the art.

We claim:

1. A method of providing a two-way voice path between a VoIP device in a network and a mobile station wherein a call originates at the VoIP device, the method comprising:

processing a call connection request at a VoIP call-server;
initiating mobile call set-up at a Network Server Platform (NSP), wherein said step of initiating mobile call set-up comprises:
  verifying the called party as a valid mobile station;
  sending a message to page the mobile station via the SRP;
  receiving page response from the mobile station; and
  instructing the VoIP call-server to forward the call connection request to the SRP;
tuning the mobile station to a digital traffic channel (DTC) to establish a voice path over the air via a Software Radio Port (SRP);
alerting both the mobile station and the VoIP device;
establishing an RTP media path for exchange of RTP data packets via the SRP; and
interconnecting the voice Path over the air and the RTP path over the packet network via the SRP.

2. A method of providing a two-way voice path between a first mobile station and a second mobile station wherein the first mobile station is associated with a first Software Radio Port (SRP) and the second mobile station is associated with a second SRP and wherein a call originates at the first mobile station, the method comprising:
  initiating call set-up for the first mobile station at the first SRP;
  tuning the first mobile station to a digital traffic channel (DTC) via the first SRP to establish a voice path over the air;
  engaging a VoIP call-server to set up a VoIP call via the first SRP;
  initiating mobile call set-up for the second mobile station via a Network Server Platform (NSP), wherein said step of initiating mobile call set-up for the second mobile station via a Network Server Platform comprises:
    verifying the called number as a valid mobile station;
    sending a message to page the second mobile station via the second SRP;
    receiving a page response from the second mobile station; and
    instructing the VoIP call-server to forward the call connection request to the second SRP;
  tuning the second mobile station to a digital traffic channel (DTC) via the second SRP to establish a voice path over the air;
  alerting the first mobile station and the second mobile station via the second SRP;
  generating a ringback tone to the first mobile station via the first SRP;
  establishing an RTP media path for exchange of RTP data packets;
  interconnecting a voice path between the first SRP and the first mobile station and an RTP path over the packet network; and
  interconnecting a voice path between the second SRP and second mobile station and an RTP path over the packet network.

3. A method of providing a two-way voice path between a first mobile station and a second mobile station wherein the first mobile station is associated with a first Software Radio Port (SRP) and the second mobile station is associated with a second SRP and wherein a call originates at the first mobile station, the method comprising:
  initiating call set-up for the first mobile station at the first SRP;
  tuning the first mobile station to a digital traffic channel (DTC) via the first SRP to establish a voice Path over the air;
  engaging a VoIP call-server to set up a VoIP call via the first SRP;
  initiating mobile call set-up for the second mobile station via a Network Server Platform (NSP);
  tuning the second mobile station to a digital traffic channel (DTC) via the second SRP to establish a voice path over the air, wherein said step of tuning the second mobile station to a digital traffic channel (DTC) via the second SRP comprises:
    sending a message to tune the second mobile station to a specified digital traffic channel; and
    detecting the second mobile station as being tuned to the specified digital traffic channel;
  alerting the first mobile station and the second mobile station via the second SRP;
  generating a ringback tone to the first mobile station via the first SRP;
  establishing an RTP media path for exchange of RTP data packets;
  interconnecting a voice path between the first SRP and the first mobile station and an RTP path over the packet network; and
  interconnecting a voice path between the second SRP and second mobile station and an RTP path over the packet network.

4. A method of providing a two-way voice path between a first mobile station and a second mobile station wherein the first mobile station is associated with a first Software Radio Port (SRP) and the second mobile station is associated with a second SRP and wherein a call originates at the first mobile station, the method comprising:
  initiating call set-up for the first mobile station at the first SRP;
  tuning the first mobile station to a digital traffic channel (DTC) via the first SRP to establish a voice path over the air;
  engaging a VoIP call-server to set up a VoIP call via the first SRP;
  initiating mobile call set-up for the second mobile station via a Network Server Platform (NSP);
  tuning the second mobile station to a digital traffic channel (DTC) via the second SRP to establish a voice path over the air;
  alerting the first mobile station and the second mobile station via the second SRP;
  generating a ringback tone to the first mobile station via the first SRP;
  establishing an RTP media path for exchange of RTP data packets, wherein said step of establishing an RTP media path for exchange of RTP data packets comprises:
    receiving a connect indication at the second SRP from the second mobile station;
    sending a connect indication from the second SRP to the VoIP call-server;
    receiving a connect indication at the first SRP from the VoIP call-server;
    sending back an acknowledge message from the first SRP;
    turning off the ringback tone;
    setting up the RTP media path for exchange of RTP data packets; and
    informing the NSP of the call connection;

interconnecting a voice path between the first SRP and the first mobile station and an RTP path over the packet network; and interconnecting a voice path between the second SRP and second mobile station and an RTP path over the packet network.

5. A method of providing a two-way voice path between a first mobile station and a second mobile station wherein the first mobile station is associated with a first Software Radio Port (SRP) and the second mobile station is associated with a second SRP and wherein a call originates at the first mobile station, the method comprising:

initiating call set-up for the first mobile station at the first SRP;

tuning the first mobile station to a digital traffic channel (DTC) via the first SRP to establish a voice path over the air:

engaging a VoIP call-server to set up a VoIP call via the first SRP;

initiating mobile call set-up for the second mobile station via a Network Server Platform (NSP);

tuning the second mobile station to a digital traffic channel (DTC) via the second SRP to establish a voice path over the air;

alerting the first mobile station and the second mobile station via the second SRP;

generating a ringback tone to the first mobile station via the first SRP;

establishing an RTP media path for exchange of RTP data packets;

interconnecting a voice path between the first SRP and the first mobile station and an RTP path over the packet network; and     interconnecting a voice path between the second SRP and second mobile station and an RTP path over the packet network, wherein said step of interconnecting a voice path between the second SRP and second mobile station and an RTP path over the packet network comprises:

converting received voice frames from the second mobile station to RTP packets to be sent to the packet network; and         converting received RTP packets to voice frames to be sent to the second mobile station.

6. A method for terminating a call between a first mobile station and a second mobile station, said first mobile station associated with a first Software Radio Port (SRP) and said second mobile station associated with a second SRP, the method comprising:

receiving a release indication at the first SRP from the first mobile station;

releasing radio resources and an RTP media path at the first SRP;

sending a call release request from the first SRP to a VoIP call-server;

sending a call release indication from the first SRP to a Network Server Platform (NSP);

receiving a release indication at the second SRP from the VoIP call-server;

sending a call release request from the second SRP to the second mobile station;

releasing radio resources and an RTP media path at the second SRP; and     sending a call release indication from the second SRP to NSP.

7. A method for maintaining an RTP media path during handoff of a mobile station from a first Software Radio Port (SRP) to a second Software Radio Port (SRP) wherein the mobile station is connected with a party, the method comprising:

sending a handoff request from the first SRP to a Network Server Platform (NSP);

handing off the mobile station from the first SRP to the second SRP via the NSP;

sending a call transfer request from the first SRP to the NSP;

releasing radio resources at the first SRP;

detecting at the second SRP the mobile station as being tuned to a digital traffic channel and sending a conference call request to the party via a VoIP call-server;

setting up an RTP media path for exchange of RTP data packets via the second SRP when the conference call has been established;

interconnecting the voice path between the second SRP and the mobile station and the RTP path;

sending a handoff complete indication from the second SRP to the NSP;

sending a call release request from the first SRP to the party via the VoIP call-server;

releasing the RTP media path at the first SRP; and sending call release indication from the first SRP to the NSP.

* * * * *